W. BALDERSTON.
DRY CELL.
APPLICATION FILED DEC. 3, 1919.
1,380,034.
Patented May 31, 1921.
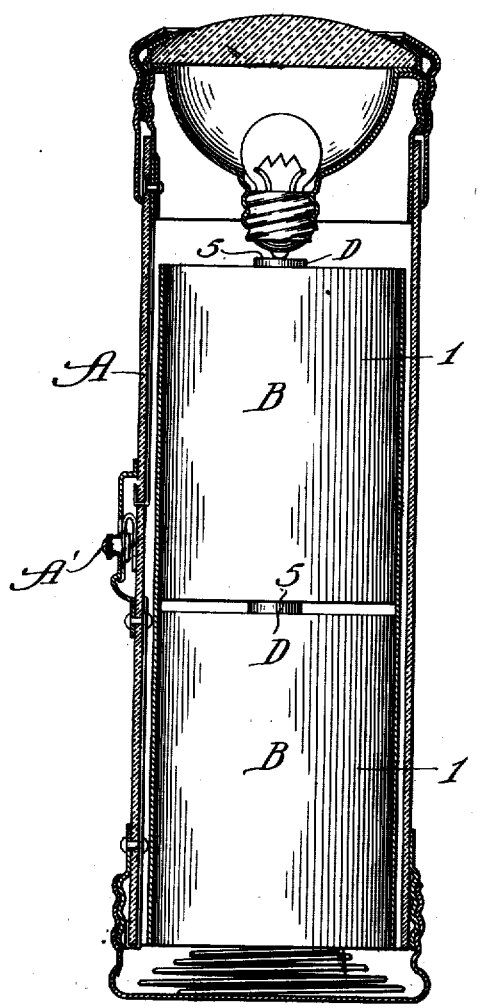
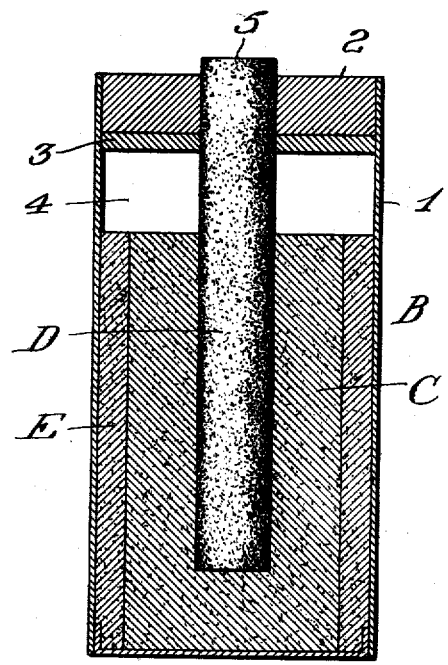
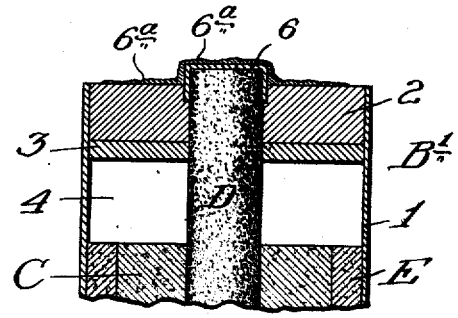
Inventor:
William Balderston,

UNITED STATES PATENT OFFICE.

WILLIAM BALDERSTON, OF MADISON, WISCONSIN, ASSIGNOR TO FRENCH BATTERY & CARBON CO., OF MADISON, WISCONSIN, A CORPORATION OF WISCONSIN.

DRY CELL.

1,380,034.   Specification of Letters Patent.   Patented May 31, 1921.

Application filed December 3, 1919. Serial No. 342,089.

*To all whom it may concern:*

Be it known that I, WILLIAM BALDERSTON, a citizen of the United States, residing at Madison, in the county of Dane, and State of Wisconsin, have invented a new and useful Improvement in Dry Cells, of which the following is a specification.

The present invention is in the nature of an improvement in dry cells; and the primary object is to provide a dry cell, especially of the type employed for use in flash-lights, which can be more cheaply manufactured and which will operate more satisfactorily than dry cells as at present constructed.

The invention is illustrated in its preferred embodiment in the accompanying drawing, in which—

Figure 1 represents a sectional view of a flash-light containing two cells constructed in accordance with the invention; Fig. 2, a sectional view of one of the cells shown in Fig. 1; and Fig. 3, a broken sectional view showing the upper portion of a known construction of cell and illustrating the difficulties experienced in the use of such cells.

Referring to Figs. 1 and 2, A represents a flash-light casing equipped with a circuit-closing device A'; and B, B, dry cells adapted for use in said flash-light.

Each cell B comprises a zinc casing 1 having its upper end closed by sealing material 2; a compacted core C of depolarizing mixture, usually comprising manganese dioxid and powdered carbonaceous material; and a carbon electrode D, preferably of circular cross-section, the lower portion of which is embedded in the core C and the upper end-portion of which is embedded in and projects slightly above the sealing material 2. The annular space between the zinc container 1 and the core C is filled with a suitable electrolyte E, usually consisting of ammonium chlorid, zinc chlorid, water and starch, the starch being gelatinized, so that the electrolyte is in the form of a paste, or jelly-like mass. It is usual to insert a disk, or washer, 3 in the upper portion of the container upon which the sealing material, or pitch, may be poured in sealing the upper end of the can. It is usual, also, to leave a space 4 in the container to permit the necessary expansion of the electrolyte and to accommodate any gases which may be formed. It may be stated, however, that as the dry cells continue to operate, some of the electrolyte is liable to ooze or be forced past the pitch 2. To prevent injury to the dry cell as a result thereof, the upper end-portion of the carbon electrode D is left naked, or uncovered. That is, the naked upper end-portion of the carbon electrode is embedded in the sealing material 2 and projects slightly above the upper surface thereof, thus presenting at the end surface of the carbon a naked carbon surface, or contact abutment, 5. Usually, the contact projects from an eighth of an inch to a quarter of an inch above the sealing material 2.

Fig. 3 represents the common method of capping the carbon electrode in this type of battery with a brass or copper cap 6. Otherwise, the cell, designated B', is constructed in the manner described, and the same reference characters are employed to indicate the parts. Heretofore in constructing dry cells of this type, it has been regarded as necessary and has been the practice to employ a brass cap on the upper end of the carbon electrode, for the supposed purpose of preserving the electrode from disintegration and giving a good contact surface. In practice, however, some of the electrolyte escapes past the seal 2 and attacks the brass cap 6, thereby forming a scale of metal oxid and electrolyte 6ª, which is reflected across, or partially across, the upper surface of the pitch seal 2. The effect is to greatly injure the contact and to tend to cause leakage, or a partial short circuit, from the upper end of the carbon electrode to the zinc can. Thus, not only is the efficiency of the cell lowered and its life shortened, but the contact is injured or rendered less conductive, so that the best results are not obtained with flash-lights employing such construction. It is found that in some cases the upper wall of the brass cap 6 is almost entirely eaten away and is re-placed by oxid and perhaps some of the electrolyte. Notwithstanding these drawbacks, it has heretofore been regarded as essential, and it has been the common practice, to employ metal caps on the upper ends of the carbon electrodes for contact purposes.

In accordance with the present invention, the metal caps are wholly dispensed with, and the naked carbon surface is employed as an abutment contact. Thus, in Fig. 1 the zinc can of the upper cell rests upon the naked carbon surface of the carbon electrode of the upper cell, and the contact at the inner end of the shank of the lamp-bulb rests upon the naked carbon surface of the electrode D of the upper cell. It is found in practice that the naked carbon surface affords a perfectly good contact, and that the contact will not become coated or incrusted with any materials which tend to injure or destroy the contact or lessen the conductivity thereof. Moreover, the tendency of a scale to form across the upper surface of the cell 2 is greatly lessened, and the tendency, therefore, is to prolong the life of the cell.

The foregoing detailed description has been given for clearness of understanding only, and no unnecessary limitation should be understood therefrom, but the appended claims should be construed as broadly as permissible, in view of the prior art.

What I regard as new and desire to secure by Letters Patent is:

1. A dry cell comprising a container having sealing material closing the upper end thereof, a core of depolarizing mixture in said container, electrolyte between said core and container, and a carbon electrode embedded in said core and extending through said sealing material and having a naked carbon end surface exposed as an abutment contact above said sealing material.

2. A dry cell comprising a container having sealing material closing the upper end thereof, a core of depolarizing mixture in said container and a carbon electrode embedded in said core and having a naked upper end portion embedded in and projecting slightly above the said sealing material, the end surface of said electrode serving as a non-corrodible abutment contact.

WILLIAM BALDERSTON.